Oct. 20, 1936.   A. F. REHNBERG   2,057,692
ROLLER BEARING ASSEMBLING MACHINE
Filed Dec. 16, 1933   8 Sheets-Sheet 1

Fig. 1

Inventor:
Axel F. Rehnberg
By Wilson, Bowell, McCanna & Hinter
Attys.

Oct. 20, 1936.  A. F. REHNBERG  2,057,692
ROLLER BEARING ASSEMBLING MACHINE
Filed Dec. 16, 1933  8 Sheets-Sheet 2

Fig. 2

Inventor:
Axel F. Rehnberg
By
Wilson, Dowell, McCanna & Wintercorn
Attys.

Oct. 20, 1936.  A. F. REHNBERG  2,057,692
ROLLER BEARING ASSEMBLING MACHINE
Filed Dec. 16, 1933  8 Sheets-Sheet 3

Fig. 3

Inventor:
Axel F. Rehnberg
By Wilson, Bowell,
McCanna & Wintercorn
Attys.

Oct. 20, 1936.  A. F. REHNBERG  2,057,692
ROLLER BEARING ASSEMBLING MACHINE
Filed Dec. 16, 1933  8 Sheets-Sheet 5

Inventor
Axel F. Rehnberg
By
Wilson, Lowell, McCanna & Wintercorn
Attys.

Oct. 20, 1936.　　　A. F. REHNBERG　　　2,057,692
ROLLER BEARING ASSEMBLING MACHINE
Filed Dec. 16, 1933　　　8 Sheets-Sheet 7

Inventor:
Axel F. Rehnberg
By Wilson, Dowell,
McCanna & Wintercorn Attys.

Oct. 20, 1936.  A. F. REHNBERG  2,057,692
ROLLER BEARING ASSEMBLING MACHINE
Filed Dec. 16, 1933  8 Sheets-Sheet 8

Inventor
Axel F. Rehnberg
By Wilson, Dowell,
McCanna & Wintercorn
Attys.

Patented Oct. 20, 1936

2,057,692

UNITED STATES PATENT OFFICE 2,057,692

ROLLER BEARING ASSEMBLING MACHINE

Axel F. Rehnberg, Rockford, Ill., assignor, by mesne assignments, to Borg-Warner Corporation, Chicago, Ill., a corporation of Illinois Application December 16, 1933, Serial No. 702,683

29 Claims. (Cl. 29—84)

This invention relates to a machine for assembling roller bearings and the like.

The principal object of the invention is to provide a machine adapted for assembling a set of rollers and a pressed-in retainer ring in a cup-shaped bearing, such as is used on the trunnions of trunnion type universal joints, as disclosed, for example, in the copending application of Carl E. Swenson, Serial No. 646,432, filed December 9, 1932.

The machine of my invention embodies various novel features among which may be mentioned the following:

(1) The provision of a roller chute having therein a zigzag passage for the rollers to run through, the chute being continuously supplied with rollers at the upper end from a feed mechanism and being mounted for oscillation for the three-fold purpose of (a) permitting lateral vibration of the chute to insure discharge of rollers through the passage by gravity when they are being delivered to a bearing; (b) permitting swinging movement of the chute from a discharge position to an out-of-the-way position closing off the outlet end of the passage, and (c) permitting opening or closing of the passage in the chute by means of a gate relative to which the chute is oscillated, the gate closing the passage near the upper end so that only a predetermined number of rollers are in the passage therebelow to be discharged by gravity to the bearing in the vibration of the chute, and the gate being open when the chute is moved to its out-of-the-way position so that the entire passage may again be filled with rollers.

(2) The provision of a cylindrical plunger for piloting the rollers into the bearing, and cooperating jaw means for holding the rollers in a group around the plunger to assist in guiding the rollers into the bearing in the advancing of the plunger, the latter also serving as a holder and pilot for the retainer ring to move it with the rollers into the bearing and press the ring into place.

(3) The provision of a plunger as defined in (2) of two-piece construction, namely, a sleeve movable positively toward the bearing so as to press the retainer ring into place, and a yieldable center post working inside the sleeve and projecting therefrom normally to an extent sufficient to act as a pilot for the rollers but arranged to engage the end wall of the bearing and have the sleeve move relative thereto to press the retainer ring home for completion of the assembling operation.

(4) The provision of jaw means as defined in (2) having cam means for holding the jaws apart slightly while the rollers are being grouped around the pilot plunger, and spring means for closing the jaws tightly as soon as permitted by the movement of the cam whereby to bring the rollers close together and into snug engagement with the plunger so that they may be entered as a group into the bearing with ease and facility.

(5) The provision of jaw means as defined in (2) of sectional construction so that the rollers are first grouped around the pilot plunger by jaws engaging the rollers substantially their full length, but certain jaw sections are retracted in the movement of the plunger toward the bearing, and the rollers are engaged only for a portion of their length up to the time the ends thereof are started into the bearing bore, whereupon the jaws completely disengage and the rollers are moved the rest of the way into the bearing engaged by the plunger alone.

(6) The provision of means for frictionally gripping a bearing block in a certain advanced position preparatory to assembling the rollers and retainer ring therein, and an adjustable positive stop behind and in a predetermined spaced relation to the bearing block, whereby the block is adapted to receive the rollers, but upon engagement of the ring therein is adapted to be moved back against the stop whereupon the ring is pressed into place to a depth predetermined by the adjustment of the stop. This not only insures exact positioning of the retainer ring so that the rollers will not bind in the bearing, but also permits assembling comparatively short length rollers in a bearing with practically the same facility as longer ones in other bearings.

The invention will be better understood as reference is made in the following description to the accompanying drawings, wherein—

The same reference numerals are applied to corresponding parts throughout the views.

Before proceeding with a detailed description of the machine, it should be understood that the mere fact that reference is made to assembling rollers and retainer rings in bearing blocks for trunnion type universal joints, the invention is not to be regarded as limited thereto; the machine, by slight change in certain of its details can be made to perform similar assembling operations on other cup-shaped bearings. Then, too, while the machine has been especially designed to overcome the difficulties encountered in the assembling of bearings closed at one end, it should be understood that it would work equally as well on bearings open at both ends where, for example, one end was specially formed to retain the adjacent ends of the rollers, or where retainer rings have previously been threaded or pressed into place in one end of the bearings to retain the rollers at that end. The invention, in other words, should be regarded as embracing all applications, whether for bearings or other devices requiring assembling in a similar manner, for which the machine is or may be adapted by reason of the peculiar cycle of movements of its principal parts, to wit: the pilot plunger designated generally by the numeral 21, the jaws 22—22', and the oscillating roller feed chute 23.

Figure 17:
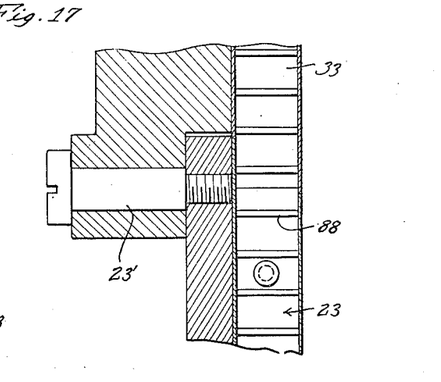
Fig. 17 is a sectional detail of the chute mounting.

Referring in a general way to the machine, 24 designates the table or bed of the machine supported by legs 25 and having a housing 26 thereon for most of the operating gears and cams to which reference will be made later. A standard 27 supports a hopper 28 over the table 24 from which retainer rings $a$ are fed down a chute 29 in response to the turning of a disc 30. Another hopper 31 containing rollers $b$ is supported at another elevation above the table 24 as indicated at 32, and the rollers are fed from this hopper downwardly through a chute 33 into the chute 23 in the turning of a disc 34. The rings $a$ and rollers $b$ are fed toward one point where the lowermost ring in the chute 29 is concentric with the pilot plunger 21 and bearing $c$ to be assembled, and where the lowermost rollers $b$ from the chute 23 form a circle around the plunger in front of the ring for assembling with the ring in the bearing, as will now be described. The chute 23 is pivoted at its upper end relative to the chute 33 as at 23' (Fig. 17) for lateral oscillation or vibration, as described presently.

Figure 1:
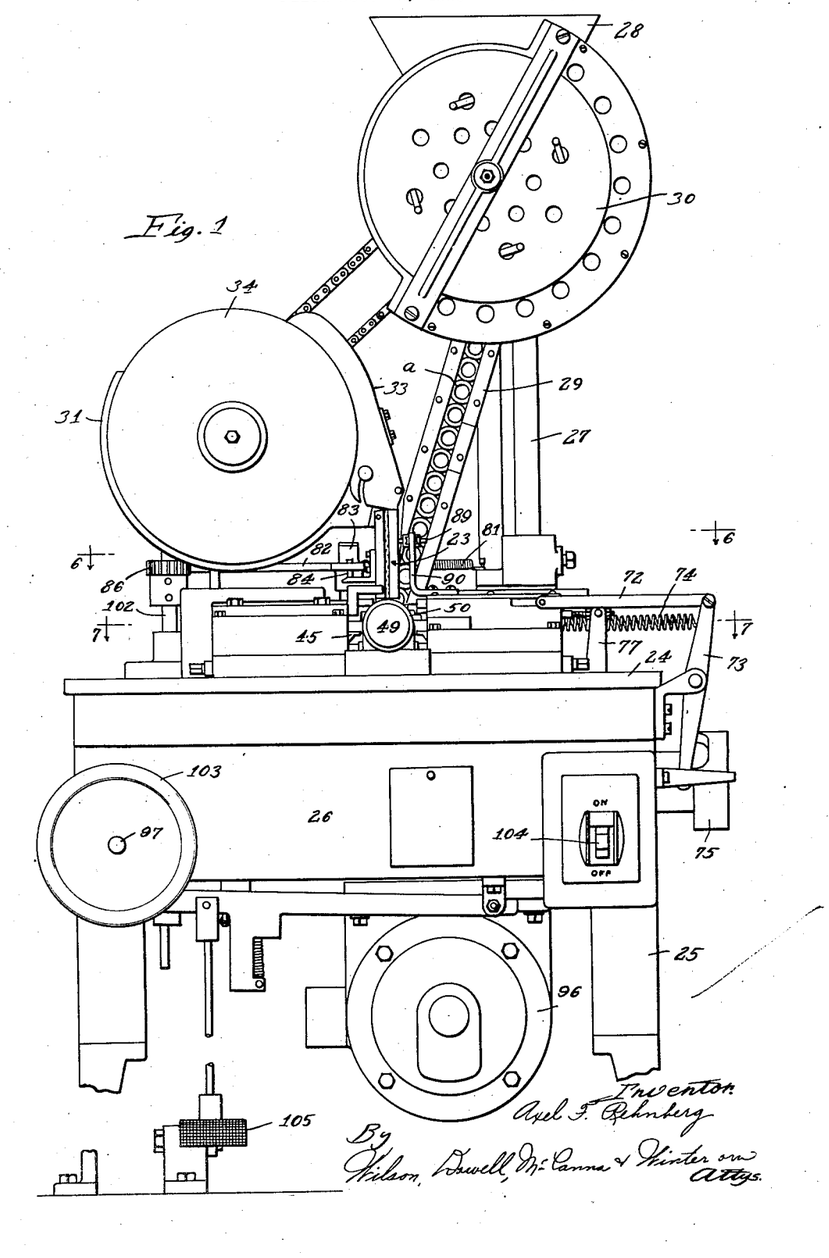
Figure 1 is a front view of the machine.
Figure 2:
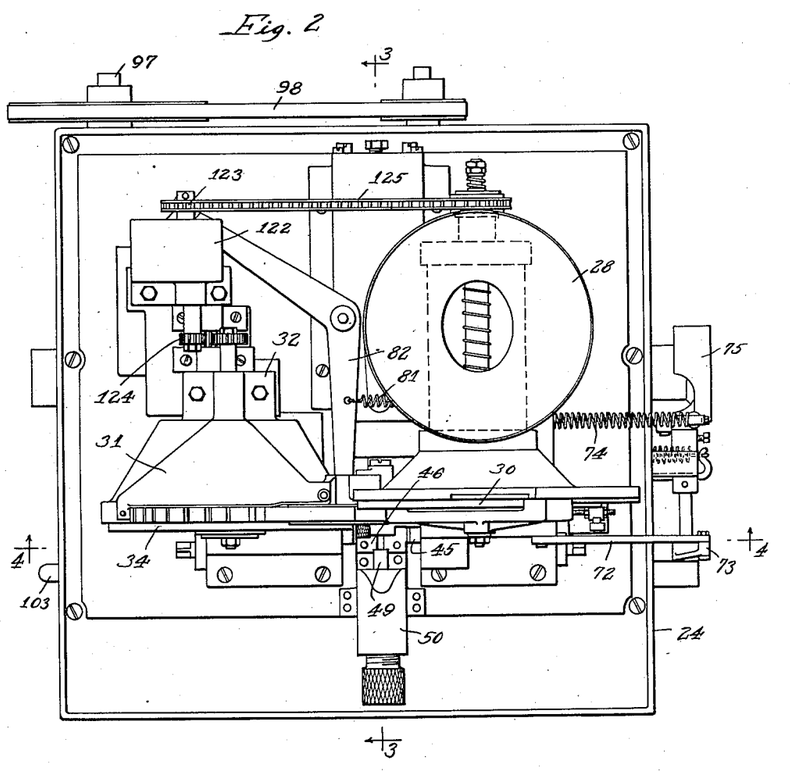
Fig. 2 is a plan view.
Figure 3:
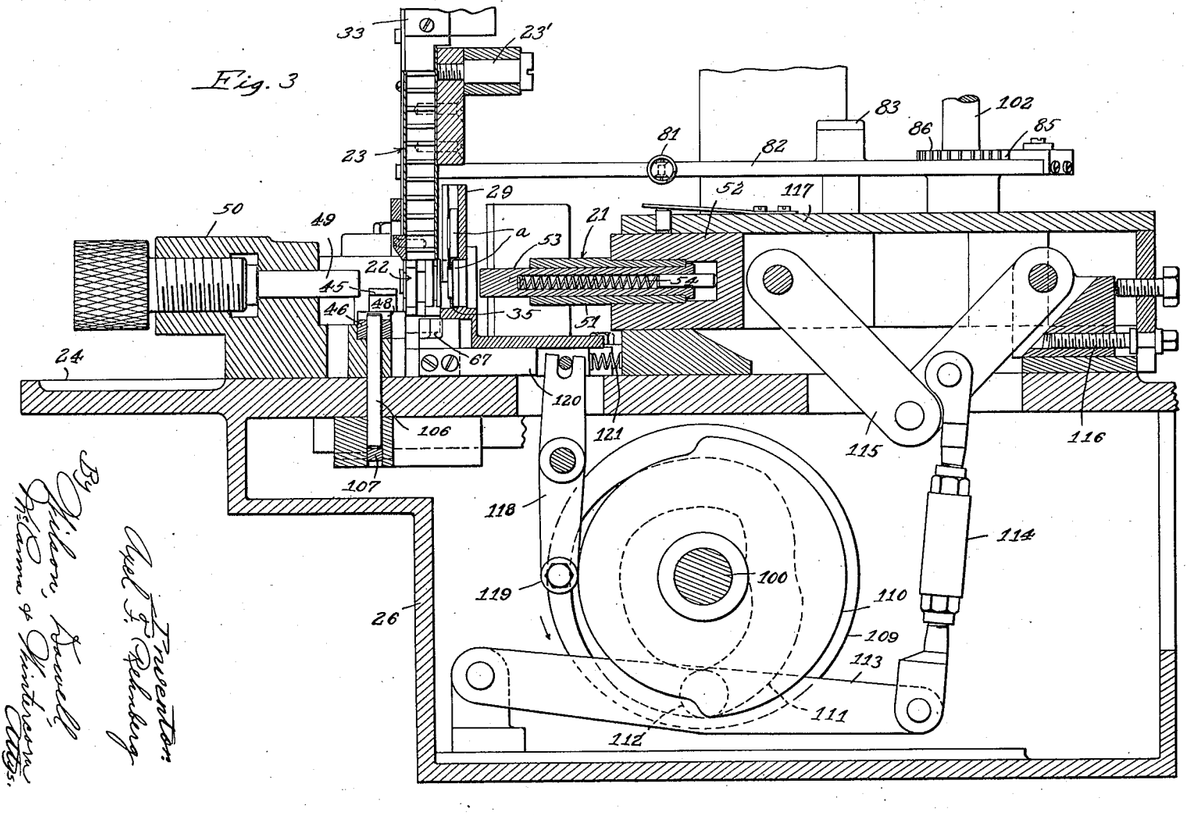
Fig. 3 is a vertical longitudinal section through the principal part of the machine on a slightly larger scale and taken on the line 3—3 of Fig. 2.
Figure 8:
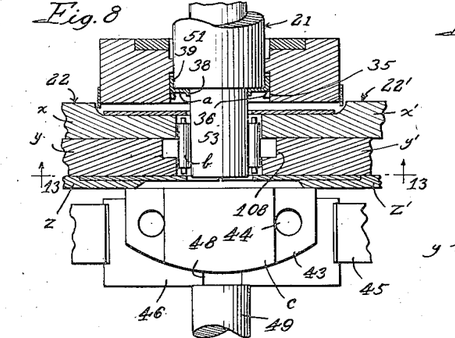
Fig. 8 is an enlarged horizontal sectional detail through the principal working parts showing the pilot plunger and cooperating jaws in the first position of the assembling operation with the rollers grouped around the plunger and the retainer ring on the plunger.
Figure 9:
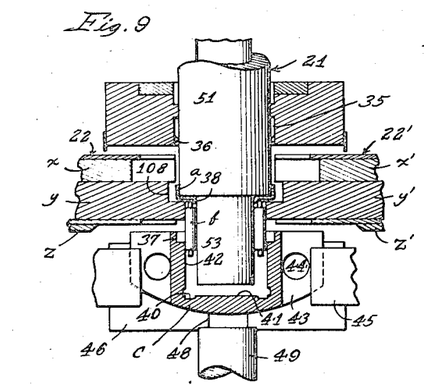
Figs. 9, 10 and 11 show the parts in different advanced stages of the bearing assembling operation.
Figure 10:
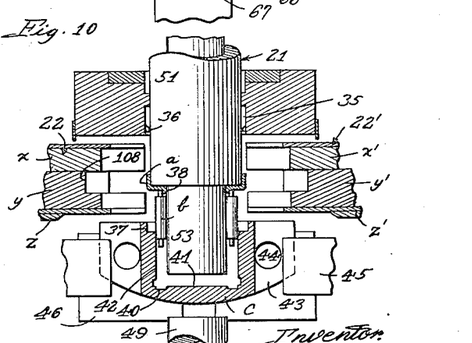
Figure 11:
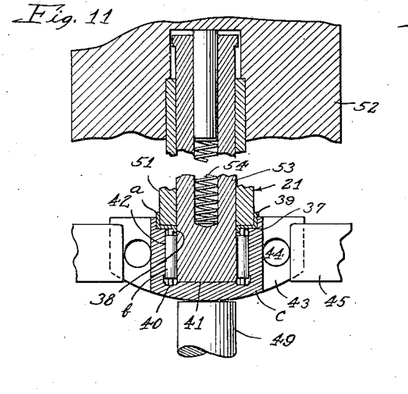
Figure 12:
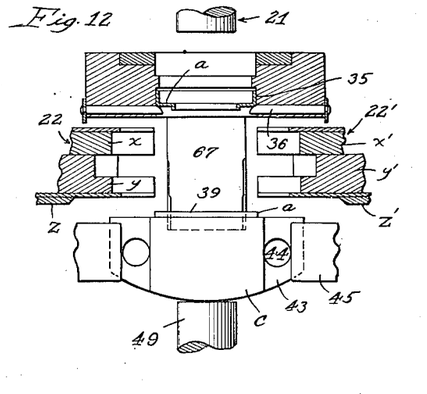
Fig. 12 shows the parts after a bearing has been assembled and the pilot plunger and jaws are retracted preparatory to starting the same operation on another bearing.

The rings $a$ are fed into a semi-circular holder 35 in which they are yieldingly held by spring pressed plungers 36 as shown in Fig. 12 preparatory to entry of the pilot plunger 21 which in its forward movement enters the ring, as shown in Fig. 8. This figure shows how the enlarged portion of the plunger fits into the ring so as to center it accurately with respect to the bearing block $c$ and move the ring as shown in Figs. 9 and 10 along with the rollers $b$ into the bore of the bearing block $c$ and eventually press the ring into a counterbored recess 37 in the bearing block. The small annular internal flange 38 on the ring retains the rollers by their reduced outer ends while the annular external flange 39 which projects in the opposite direction, has a press fit in the counterbore 37 to hold the ring in place. A small portion of the flange 39 projects from the bearing block, as shown in Fig. 12, when the ring is pressed home, and forms the inner part of a dirt shield when the bearing is ultimately assembled on a universal joint, as described in the copending application of Carl E. Swenson. The inner reduced ends of the rollers $b$ enter an annular internal groove 40 provided in the end wall of the bearing block adjacent the end thrust bearing surface 41 formed on the inside of said end wall, whereby to retain the rollers at that end. In other words, the rollers are held in place in the block against dropping out prior to assembly of the bearings on the trunnions in a universal joint, as fully described in the Swenson application first mentioned. The cylindrical surface 42 of the bore in the block $c$ forms the outer raceway for the rollers $b$ to roll upon, and the inner raceway is provided by the trunnion itself when the bearing is assembled on the joint. Each block $c$, it will be observed, has laterally projecting lugs 43 with bolt holes 44 provided therein to receive fastening bolts when the bearing block is ultimately assembled on the joint, and these lugs are frictionally engaged by gripping jaws 45 to hold the block with capacity for sliding movement but in accurate concentric relation with the plunger 21, on a support 46. Accurate positioning is insured by the close working fit of a rectangular key projection 47 provided on the block in a keyway 48 formed in the support 46. The sliding of the block occurs at the end of the assembling operation when the ring $a$ has arrived at the counterbore 37, whereupon further movement of the plunger 21 to press the ring $a$ into the counterbore, results in movement of the block back against a stop 49. The latter is preferably in the form of a screw threaded in the block 50 which is mounted on the table 24 and carries the support 46 (see Fig. 3). When the bearing block $c$ is placed by hand on the support, its key 47 is of course, entered in the keyway 48, and the block is moved forward until it engages parts of the jaws 22—22', as shown in Fig. 8, after which the jaws 45 grip the same frictionally by the lugs 43. Then the rollers $b$ and ring $a$ are assembled in the block, as appears in Figs. 9 and 10, and the ring is pressed into place as in Fig. 11 when the block is backed by the stop 49. The reason the stop 49 is made adjustable is to permit accurately gauging the depth to which the rings $a$ will be pressed home into the bearings by the plunger 21, so that the rollers $b$ will not bind nor will they be too loosely retained or be free to drop out if one or more happens to be a trifle short. It is also apparent that by having the bearing block slidable from an advanced position back against a stop, rollers of shorter length can be assembled in a bearing than could otherwise be handled, assuming no change in the structure and mode of operation of the jaws 22—22' which are to be described in detail later. That is, it is possible with this arrangement to have short length rollers $b$ get the ends thereof entered in the block $c$ at an early stage of the movement of the plunger 21, so that the bore 42 in the block takes over some of the work of holding the rollers in proper relationship and guiding the same toward their ultimate positions in the block. This point is brought out clearly in Figs. 9 and 10; Fig. 10 shows the jaws 22—22' actually backed away from the rollers $b$, and the rollers depending upon their engagement in the bore 42 for guidance in the further movement of the plunger 21 to the final position shown in Fig. 11. The plunger 21, as shown in Figs. 3 and 11, is made up of two parts: an outer sleeve 51 providing the enlarged portion of the plunger for moving the rings $a$ and movable with a head 52, and an inner member 53 reciprocable in the sleeve 51 and relative to the head 52. A spring 54 acts to urge the member 53 outwardly to the limit position shown in Fig. 3 so that it projects from the sleeve to the extent shown in Figs. 8—10 for proper piloting of the rollers $b$, but may be moved inwardly by engagement with the end thrust surface 41 in the block $c$ as shown in Fig. 11. In other words, the pressing home of the rings $a$ is in no way interfered with by the plunger part 53, because the spring 54 will allow the part 53 to move inwardly to whatever small extent is required.

Figure 15:
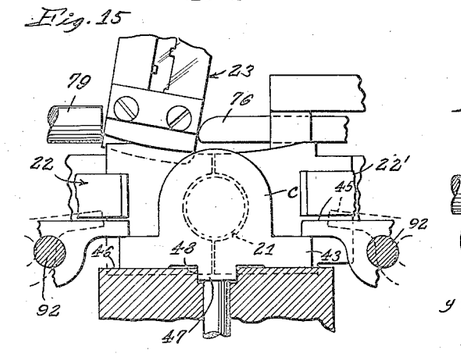
Fig. 15 is a view of the same parts in the same position but taken from behind the bearing block to show how the latter is gripped frictionally for the assembling operation.

The jaws 45 for gripping the bearing blocks $c$ move from a retracted position indicated in dotted lines in Fig. 15 to the gripping position shown in full lines. Each jaw is of bell crank form and carried on a slide 91 (see Fig. 4) and pivoted as at 92. A small spring urges the jaw in a clockwise direction against a stop when the jaw is in its retracted released position, but when the slide 91 is moved to bring the jaw to its gripping position, an adjustable set screw 93 engages the jaw and positively moves it in a counterclockwise direction to grip the bearing block by its lug 43. Shifters 94 and 94', suitably mounted for oscillation in the housing 26 and adjustably connected with the slides 91 as indicated at 91', are operated by the cams 95 and 95' to move the jaws 45 to and from gripping position. The cams 95 and 95' turn with the other cams in the housing 26.

Figures 4, 5:
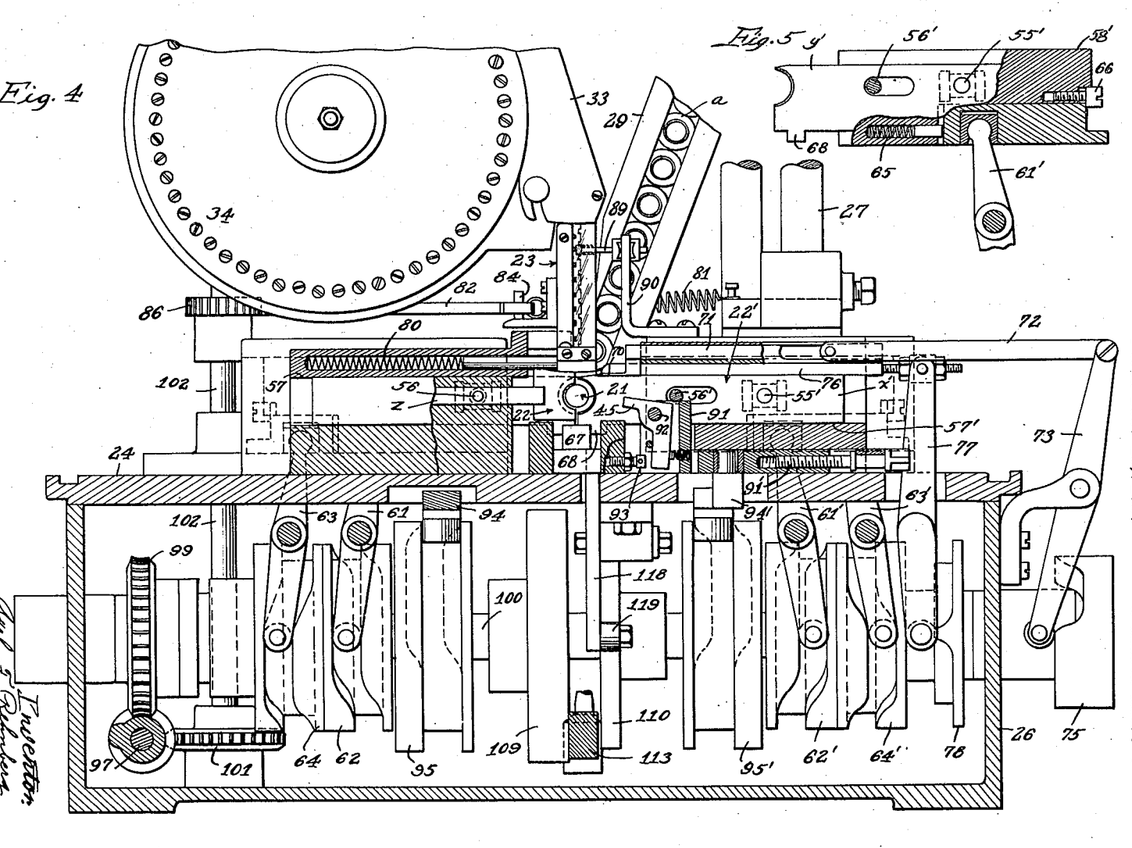
Fig. 4 is a vertical section in a transverse plane on the line 4—4 of Fig. 2 on a less enlarged scale.
Fig. 5 is a sectional detail of one of the jaws appearing in Fig. 4.
Figure 6:
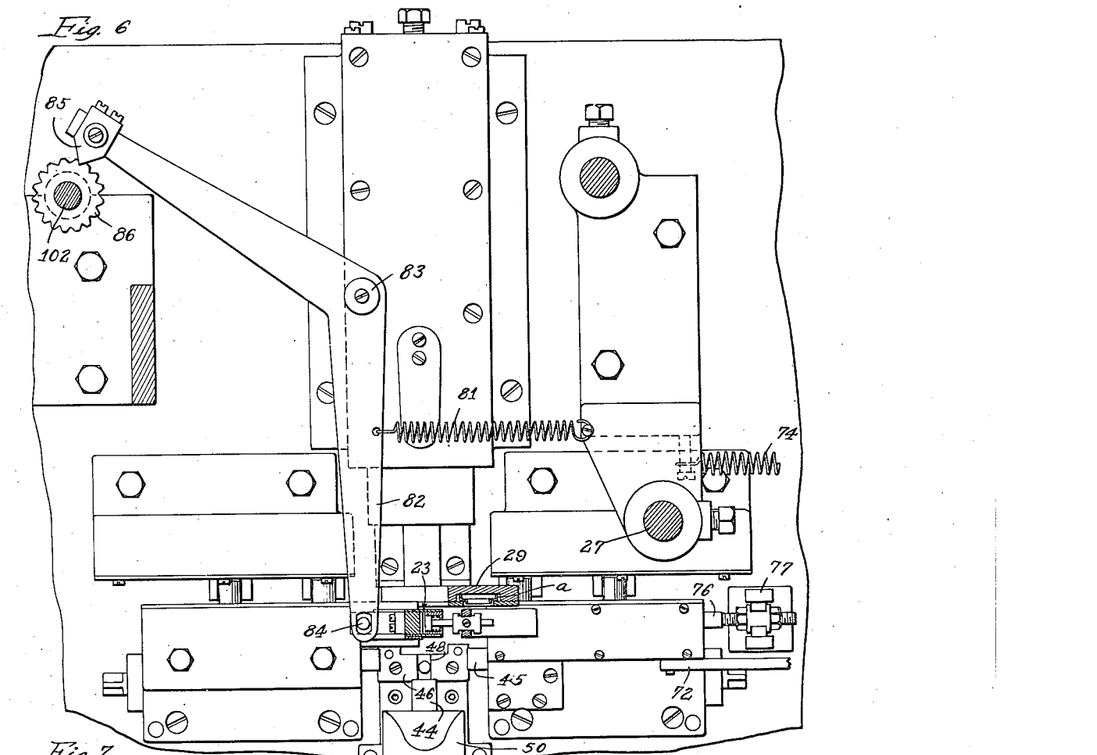
Figs. 6 and 7 are horizontal sections on the correspondingly numbered lines of Figure 1.
Figure 7:
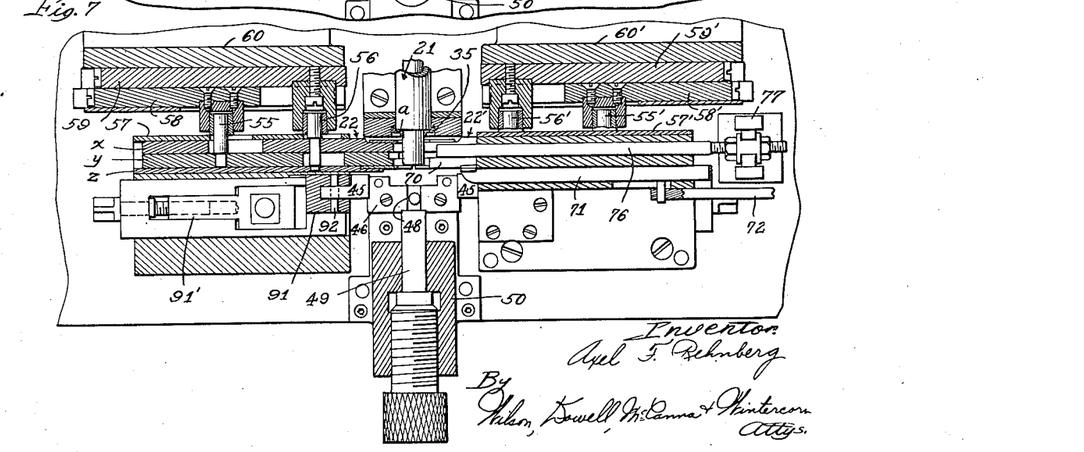
Figure 13:
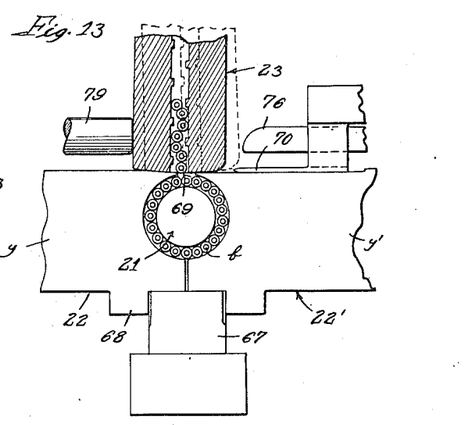
Fig. 13 is a vertical section on the line 13—13 of Fig. 8 showing how the rollers are fed in between the jaws around the pilot plunger.
Figure 14:
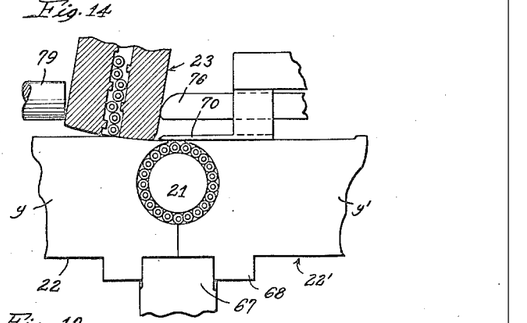
Fig. 14 is a sectional view of the same parts but showing the oscillating chute moved out of the way and the jaws closed to close the circle of rollers tightly around the plunger.

The action of the jaws 22—22' with respect to the movement of the plunger 21 and chute 23 will be clear from a study of Figs. 4, 5, 7–10 and 12–15. Referring particularly to Fig. 7, it will be observed that the jaws 22 and 22' are of sectional construction, comprising slides $x$, $y$ and $z$ and $x'$, $y'$ and $z'$, respectively. The middle slides $y$ and $y'$ are operable by pins 55 and 55', respectively, which project through slots in the slides $x$ and $x'$, and the outer slides $x$ and $z$ and $x'$ and $z'$ are operable by pins 56 and 56', respectively, which work in slots in the middle slides $y$ and $y'$, thus permitting movement of the outer slides independently of the middle slides. The slides forming the jaws 22—22' are reciprocable in suitable guides 57 and 57', respectively, in the reciprocation of slides 58—59 and 58'—59' working in guides 60 and 60'. The slides 58—58', it will be observed, connect with pins 55—55' to work the slides $y$—$y'$, and the slides 59—59' connect with pins 56—56' to work the slides $x$—$z$ and $x'$—$z'$. Slides 58—58' are arranged to be moved by fulcrum levers 61—61' that are oscillated by cams 62—62'. Slides 59—59' are similarly operated by levers 63—63' and cooperating cams 64—64'. The levers are suitably mounted for oscillation in the housing 26 above the cams. In each instance the positively operated lever is yieldingly connected with its slide as illustrated in Fig. 5, so that the jaw slides $x$—$z$ and $x'$—$z'$ can be closed yieldingly under the pressure of springs 65 compressed in the positive actuation of the jaws. The adjustment of screws 66 advances or retards the point of engagement of the jaws in relation to the movement of the actuating levers. Now, there is a cam 67 which enters between the downwardly projecting lugs 68 on the jaw slides $x$—$z$ and $x'$—$z'$ to prevent the jaws from fully closing when they are brought together by oscillation of the levers 61—63 and 61'—63'. This cam is movable fore and aft, crosswise with relation to the laterally movable jaws, and when it is as far forward as it will go, it holds the jaws apart to the extent shown in Fig. 13 so as to leave a gap 69 between the jaws at the top sufficient for the easy entrance of rollers $b$ into the space between the jaws and around the pilot plunger 21. On the other hand, when the cam is moved to the rear, the jaws close fully as shown in Fig. 14 under action of the springs 65 whereby to form a compact group of rollers around the plunger 21 and cut down the size of the top opening 69. A finger 70 is slidable over the jaws to the position shown in Fig. 14 to close the circular space between the jaws by bridging the gap 69. This finger moves into position practically simultaneously with the withdrawal of the cam 67 so that there is no opportunity for one of the rollers $b$ to jump out in the closing of the jaws. The finger 70 is operable by means of a slide 71 which has a pin connection with a link 72 in turn connected to an oscillating lever 73 fulcrumed on the side of the machine as shown. A coiled tension spring 74 tends to move the lever 73 in one direction and it is moved in the other direction by a cam 75 turning with the cams 62—64 and 62'—64' previously mentioned. While the gap 69 is uncovered and the jaws are held apart by the cam 67, the chute 23 has its lower discharge end poised directly over the gap so that rollers $b$ will run down between the jaws and around the pilot plunger 21 in the vibration of the chute, which will be described presently. However, when the jaws are closed and the finger 70 covers the gap 69, a slide 76 engages the lower end of the chute 23 and moves it from the position of Fig. 13 to the inoperative out-of-the-way position shown in Fig. 14 in which the lower end of the chute is closed by the top of the jaw 22. The slide 76 is operable by means of an oscillating lever 77 fulcrumed in the housing 26 and operated by a cam 78 turning with the other cams in said housing. A plunger 79 bearing against the lower end of the chute 23 on the opposite side from the slide returns the chute to a normal central position under the action of a coiled compression spring 80 (see Fig. 18). The plunger 79 being constantly in engagement with the lower end of the chute 23 under the action of the spring 80, assists a coiled tension spring 81 in normally tending to swing a bell crank lever 82 in a counterclockwise direction about its pivot 83. The lever 82 has a loose pin connection at one end with the chute 23 as at 84 and at its other end carries a wedge-shaped tooth 85 which rides in and out on the teeth of a rotary ratchet pinion 86. So long as the slide 76 is in retracted position, the chute 23 is therefore in a central position as disclosed in Figs. 13 and 18 vibrating or oscillating laterally with the bell crank lever 82, but when the slide 76 is moved by the cam 78 to the position shown in Fig. 14, the chute 23 is moved to an out-of-the-way position and the lever 82 is at the same time disengaged from operative relationship to the ratchet pinion 86 so that vibration of the chute is discontinued.

Figure 16:
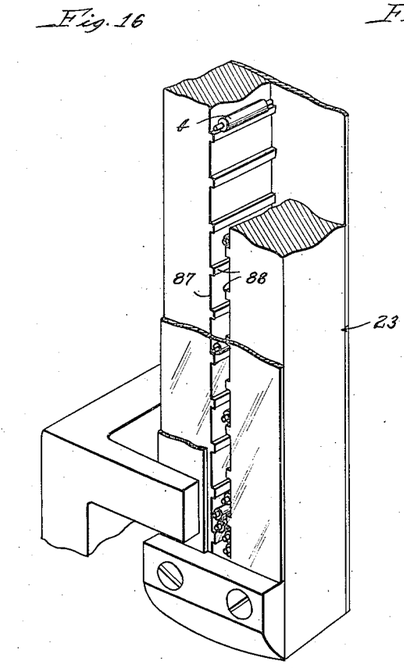
Fig. 16 is a perspective view of the oscillating chute with parts broken away and appearing in section to better illustrate the construction.

The chute 23, like its companion 33, has a longitudinal passage 87 therethrough slightly wider than the rollers b to be fed therethrough, so that the rollers will feed through easily, and there are slight transverse ridge projections 88 on opposite walls of the passage in staggered relationship and properly spaced lengthwise of the passage to allow the rollers to feed through in a zigzag course in the vibration or oscillation of the chute, as indicated in Fig. 16. In this way the rollers are not free to tumble, in hit or miss fashion through the chutes, but are caused to assume approximate parallelism by reason of contact with one after another of the projections 88 first on one side and then on the other side of the passage. There is, therefore, no likelihood of rollers becoming lodged at some point in the chute itself or at the point of discharge of rollers in between the jaws 22—22' and around the pilot plunger 21. There is sufficient pitch to the passage in the chute 33 for the rollers to pass down freely by gravity alone. The vibration of the chute 23 positively eliminates any danger of the roller feed being interrupted by one or more rollers coming through too slowly and hindering the travel of rollers behind them. The feed is in fact so good that I have found it desirable although not essential to shut off the passage near the upper end of the chute 23 with a gate 89 carried loosely on a bracket 90. This gate is simply in the form of a plunger spring-pressed toward closed position, and it serves to hold back the column of rollers in chute 33 so as to allow only those rollers below the gate in the chute 23 to be fed down into the jaws 22—22'. The gate is located so that there will be certainly more than enough rollers present in the passage 87 below the gate 89 to fill the space between the jaws. By cutting off the column of rollers above the number being vibrated in the chute 23, I eliminate too much load on the rollers which in spite of the construction of the chute and the fact that it is vibrated, might still cause clogging. The gate 89 releases the rollers for passage down into the chute 23 its full length when the latter is moved to the left and away from the gate 89 to the position of Fig. 14. In that way the chute 23 is loaded with rollers in between the assembling operations.

Referring to Fig. 13, I would also call attention to the fact that the gap 69 between the jaws is wide enough and so disposed with respect to the pilot plunger 21 that, in the oscillation of the chute 23, rollers are dropped into the space around the pilot plunger, some on one side of the center and some on the other side. In that way, the space is filled completely, as appears in Fig. 14. Obviously, if the rollers were all fed into the assembling chamber on one side of the center of the pilot 21, they would stack up until that side of the chamber was completely filled; the group of rollers in the chamber would not shift around the pilot sufficiently to enable filling the other side too.

Figures 18, 19, 20:
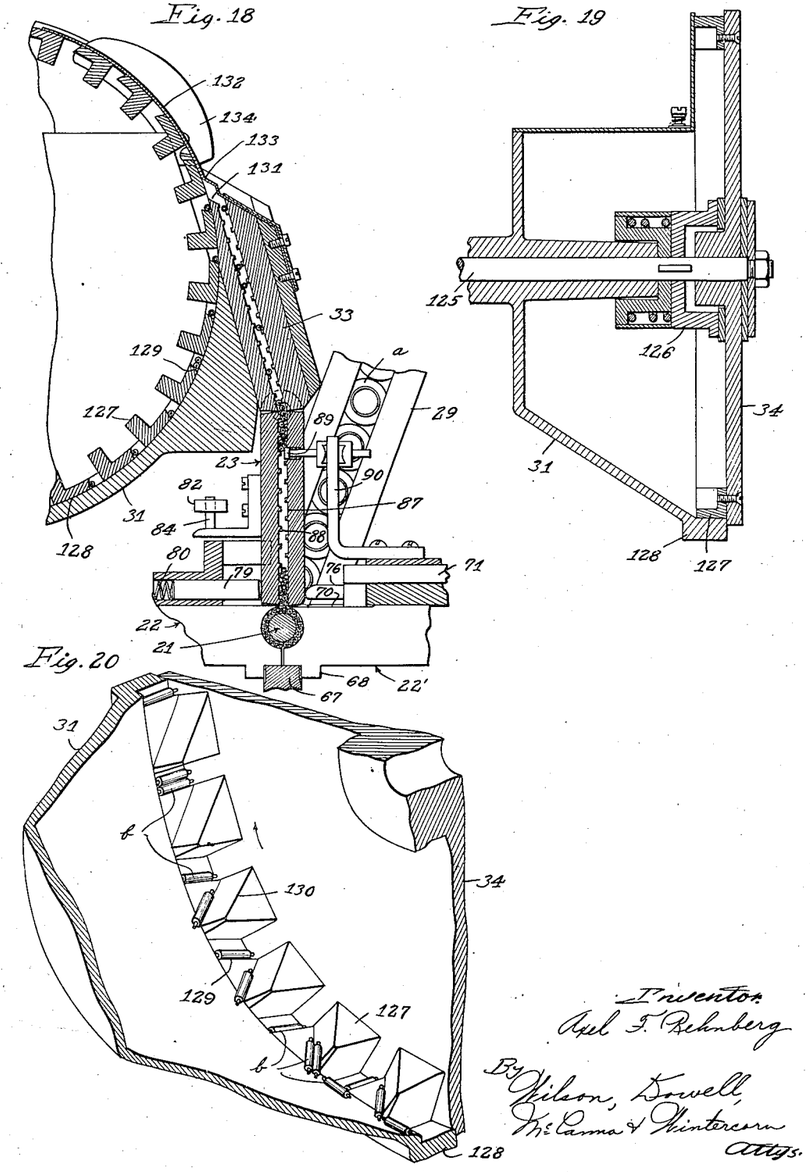
Fig. 18 is a vertical section behind the plane of the section shown in Fig. 4 so as to show the roller feed mechanism.
Fig. 19 is a section in a transverse plane through the feed mechanism.
Fig. 20 is a perspective view looking at the inside of the feed mechanism and illustrating its mode of operation.

The rollers b are fed one or two at a time from the hopper 31 off the periphery of the disc 34 into the chute 33 as should be clear from examination of Figs. 18 and 20. As indicated in Fig. 19, a shaft 125 positively driven in the manner hereinafter described, is keyed to a drum 126 spring-pressed toward frictional engagement with the disc 34 to provide frictional drive. The disc 34 carries a plurality of lugs 127 on the inside thereof adjacent the periphery arranged to ride around the inside of the rim 128 of the hopper 31. These lugs, as clearly appears in Fig. 18, provide shoulders 129 on the front thereof on which rollers will lodge in the turning of the disc relative to the hopper, as the shoulders pass the lowermost portion of the hopper and are therefore moving through the mound of rollers that have been dumped into the hopper. There is sufficient space between the lugs so that two rollers may be picked up on the shoulder of one lug, although there will usually be one, as indicated in Fig. 20. The front of each lug is beveled off as at 130 next to the shoulder 129 so that the shoulder is no thicker than the rollers to be fed thereby from the hopper, and any excess rollers that have not found their way into the space between the lugs and in front of the shoulders 129 will be deflected away from the disc 34 back into the hopper. The inclination of these surfaces 130 positively insures riding off of any rollers that may remain thereon after lugs pass through the mound of rollers in the hopper; the rollers will drop off by gravity long before they reach the point of discharge into the chute 33. At 131 is shown the throat leading into the passage through the chute 33. The throat is inclined downwardly and as the shoulders 129 come into position alongside the throat, their inclination is enough to insure rolling of the rollers off the shoulders and into the chute 33, as must be clear from inspection of Fig. 18. A leaf spring 132 is mounted on the upper end of the chute 33 and is curved to form an extension of the rim 128 above the point of discharge into the hopper 33. This spring is shaped as indicated at 133 to provide a small pocket above the throat 131 to receive the topmost roller in the chute 33, and, if another roller is crowded in, such that jamming or binding would otherwise occur, the spring 132 will flex sufficiently to allow the excess roller or rollers to ride up under the spring and eventually find a space between lugs 127 through which to drop back into the hopper, aided by the resilience of the spring 132. Guards 134 flanking the spring 132 prevent rollers that get under the spring 132 from dropping off the disc 34 alongside the hopper.

Driving connections

An electric motor 96 is suspended from the housing 26 and transmits drive to shaft 97 by the belt and pulley connection indicated at 98 at the back of the machine. There are two worms on the shaft 97 in the housing 26, the one meshing with a worm gear 99 to drive the horizontal cam shaft 100, and the other meshing with a worm gear 101 for driving the vertical shaft 102 on which the ratchet pinion 86 is keyed for rotation. It is from these two shafts 100 and 102 that the various parts of the machine get their drive. A hand wheel 103 is provided on the front end of the shaft 97 to permit turning the machine over by hand, as when making adjustments. At 104 there is indicated the switch controlling the power operation of the machine, and at 105 a foot treadle, the depression of which puts the machine through one complete cycle, as in the case of a punch press, that is, the cam shaft 100 will be given a complete turn and no more unless the treadle is released and depressed again. Single operation clutches for securing such operation are well known, and no showing thereof is given in the drawings. It is also common to provide various safety features, such, for example, as the plunger 106 appearing in Fig. 3, which is depressed by a bearing block c when the same is placed in the machine ready for assembling. This plunger moves a part 107 to a position allowing the depression of the pedal 105; in other words, the operator cannot put the machine through an operation without inserting a bearing block.

The shaft 100 turns the cams 62—64 and 62'—64' for operating the jaws 22—22'. There is such a relationship in the tracks of cams 62 and 64 and cams 62' and 64' that the jaw parts x, y and z and x', y' and z' will move together simultaneously from the retracted position of Fig. 12 to the almost closed position of Fig. 8 and eventually the fully closed position of Fig. 14, after which the jaw parts xz and x'z' are retracted prior to the retraction of jaw parts y and y', as disclosed in Fig. 9. This advanced operation of parts xz and x'z' with relation to yy' from a holding position to a retracted position is necessary for two reasons: To allow the rollers b to move with the plunger 21 transversely relative to jaw parts yy', and to allow the plunger part 51 to pass the jaw parts xx'. The jaw parts yy' are recessed on one side as at 108 (Fig. 9) to accommodate the plunger part 51 and retainer ring a to the point where the ends of the rollers b enter the bore of the bearing block c and where the jaw parts yy' are about to be retracted to the position of Fig. 10.

The shaft 100 also turns the cams 95 and 95' through the medium of which the jaws 45 are operated to grip the bearing block c. This shaft also turns the cams 75 and 78, the former for operating the slide 71 and finger 70, and the other for operating the slide 76. It is obviously necessary that the bearing block be gripped by the jaws 45 prior to the closing of jaws 22—22', and that is assured by the form and relation of the tracks in the cams operating these parts. It is also apparent that the finger 70 should be moved over to close the gap 69 between the tops of the jaws 22—22' at a proper interval after the jaws have been closed, and that is also assured by the form and relation of the cams. Inspection of cams 75 and 78 in Fig. 4 will show that the finger 70 and slide 76 are both moved over at about the same instant to close the gap 69 between the jaws and move the chute 23 out of way.

Cams 109 and 110 turn with the shaft 100 and serve to operate the plunger 21 and cam 67, respectively. The cam 109 has a track 111 in which a follower 112 mounted on lever 113 is engaged. The lever is mounted for oscillatory movement in the housing 26 as shown, and has an adjustable connection 114 with toggle linkage 115 adjustably mounted on the housing at one end as at 116 and pivotally connected at the other end to the head 52 on which the plunger 21 is mounted. The head is slidable in a guide 117 mounted on the table 24. The parts are shown in Fig. 3 with the follower 112 on the high point of the cam corresponding to the fully retracted position of the plunger. Assuming counterclockwise rotation of the shaft 100, when the cam 109 has turned through slightly less than 90° the plunger 21 has been brought from the fully retracted position of Figs. 3 and 12 to the advanced position of Fig. 8. Then there is a slight dwell during which the jaws 22—22' are closed by reason of retracting of the cam 67, and after that slight further advancing movement of the plunger 21 from the position of Fig. 8 to that of Fig. 9, whereupon there is a further dwell while the jaws 22—22' open fully, as in Fig. 10, and thereafter the plunger 21 is given its final movement from the position of Fig. 10 to that of Fig. 11, after which the plunger is quickly retracted from the position of Fig. 11 to that of Figs. 3 and 12. The retracting of the cam 67 is accomplished by means of a lever 118 mounted for oscillation in the housing 26 and having a follower 119 riding on the periphery of cam 110. The lever 118 has a pin and slot connection with a slide 120 for operating the cam 67. A spring 121 keeps the follower 119 in contact with the periphery of the cam 110, by tending normally to move the slide 120 forwardly.

The shaft 102 in addition to turning the ratchet pinion 86 for vibrating the chute 23 is connected with the discs 30 and 34 of hoppers 28 and 31 to turn these parts at the proper speeds so as to feed rings a and rollers b at the proper rate through chutes 29 and 33, respectively. The shaft projects upwardly beyond the pinion 86 into a housing 122 in which there is suitable gearing connected therewith to drive a sprocket 123 and a pinion 124. The sprocket is connected through a chain 125 with another sprocket to drive the disc 30 for feeding rings a from hopper 28 into chute 29. The pinion 124, on the other hand, meshes with other gears to drive the disc 34 so as to feed rollers from the hopper 31 into chute 33.

The novel features of my improved rotary disk roller feed as represented in Figs. 16, 18, 19 and 20 hereof are described and claimed in my co-pending application Serial No. 712,849 and the features of the roller feed embodying means providing a zigzag travel of the rollers as represented in Figs. 16 and 18 hereof are described and claimed in my copending application Serial No. 58,680.

It is believed the foregoing description conveys a good understanding of the various objects and advantages of my invention, and the appended claims have been drawn with a view to covering all legitimate modifications and adaptations.

I claim:

1. A roller bearing assembling machine, adapted for assembling rollers and a retaining ring therefor in a cup-shaped bearing, comprising a pilot plunger mounted for endwise movement into and out of the open end of a bearing, means for supporting a bearing in coaxial relation thereto, jaws movable transversely relative to the pilot plunger into positions spaced from and around the latter so as to form a circular chamber to receive a group of rollers around the plunger and retain the same by the jaws in such position, a holder for a retaining ring concentric with the plunger and movable therewith, and means for moving the pilot plunger together with the rollers and retaining ring into the open end of the bearing and frictionally embedding the ring in the bearing so as to leave the rollers retained in a circle around the inside of the bearing.

2. In a machine as set forth in claim 1 wherein the jaws comprise sections movable relative to one another whereby to permit holding the rollers substantially the full length thereof in the positioning of the rollers around the plunger, and thereafter the withdrawal of certain jaw sections to make way for the movement of the plunger in inserting the rollers into the bearing while they are retained in proper positions around the plunger by the remaining jaw sections, the machine including means for advancing and retracting the jaw sections in timed relation to one another.

3. A roller bearing assembling machine, adapted for assembling rollers and a retaining ring therefor in a cup-shaped bearing, comprising a pilot plunger mounted for endwise movement into and out of the open end of a bearing, means for supporting a bearing in coaxial relation thereto, jaws movable transversely relative to the pilot plunger into positions spaced from and around the latter so as to form a circular chamber to receive a group of rollers around the plunger and retain the same by the jaws in such position, said pilot plunger comprising a sleeve, and a member reciprocable therein and normally held extended therefrom under spring pressure, the projecting inner member serving to pilot the rollers and said sleeve being adapted to serve as a holder for a retaining ring, and means for moving the sleeve so as to enter the rollers into the bearing by means of the retaining ring, and thereafter frictionally embed the ring in the bearing to retain the rollers therein.

4. In a machine of the class described, the combination of a substantially horizontal cylindrical pilot, jaws movable transversely relative to the pilot and recessed on the face thereof whereby to provide a substantially circular chamber around the pilot open at the top above the pilot, when the jaws are moved into position adjacent said pilot, a stop limiting the closing of the jaws whereby to leave a wider opening above the pilot and a larger chamber around the same, means for delivering rollers or the like into the open top of the chamber, and means for withdrawing the stop and allowing the jaws to close when the chamber is filled.

5. In a machine of the class described, the combination of means for locating a bearing on a substantially horizontal axis to receive rollers, a substantially horizontal cylindrical pilot disposed substantially coaxial therewith, means surrounding the pilot to provide a substantially circular chamber around it open at the top, means for delivering rollers or the like into the open top of the chamber to roll by gravity into positions alongside one another filling the chamber, means for locating a ring behind the rollers in the chamber and substantially coaxial with the bearing and pilot, and means for moving said ring and pilot toward said bearing so as to enter the rollers therein and press the ring onto the bearing to retain the rollers therein.

6. In a machine of the character described, the combination of a reciprocable pilot plunger, means for frictionally gripping a cup-shaped member in concentric relation to the plunger so that the latter is movable into and out of the open end thereof toward and away from the end wall of the member, the cup-shaped member being movable by the plunger, a stop behind the cup-shaped member for limiting its movement with the plunger, the plunger being formed to provide an annular shoulder thereon for holding a retainer ring and pressing the ring into the open end of the cup-shaped member while the member is supported by its engagement with the aforesaid stop, and means for slidably holding a group of rollers or the like around the pilot plunger whereby to enter the rollers in the cup-shaped member with the retainer ring and have the rollers retained in the cup-shaped member when said ring is pressed into place therein.

7. In a machine of the character described, the combination of a substantially horizontal reciprocable pilot plunger, means for frictionally gripping a cup-shaped member in concentric relation to the plunger so that the latter is movable into and out of the open end thereof toward and away from the end wall of the member, the cup-shaped member being movable by the plunger, a stop behind the cup-shaped member for limiting its movement with the plunger, the plunger being formed to provide an annular shoulder thereon for holding a retainer ring and pressing the ring into the open end of the cup-shaped member while the member is supported by its engagement with the aforesaid stop, jaws movable transversely with respect to the plunger into a predetermined spaced relation thereto to provide firstly a substantially circular chamber around the plunger between the retainer ring and the cup-shaped member adapted to receive a circular group of rollers, the chamber being open at the top for gravity feed of rollers therein, means for feeding rollers by gravity into the chamber, and means for subsequently closing the jaws sufficiently to frictionally grip the rollers in a closed circle around the plunger but so as to permit sliding of the rollers relative to the jaws into the cup-shaped member by movement of the plunger, the rollers being retained in the cup-shaped member when the retainer ring is pressed into place therein.

8. In a bearing assembling machine, adapted for inserting rollers in a bearing and pressing a drive fit retainer ring therefor onto the end of said bearing, the combination of means for holding a bearing for assembling, and a single member for simultaneously piloting a group of rollers into the bearing with a retainer ring therebehind, and pressing said retainer ring onto the end of said bearing to hold the rollers in place therein.

9. In a bearing assembling machine, adapted for inserting rollers in a bearing and pressing a retainer ring therefor onto the end of said bearing, the combination of means for holding a bearing for assembling, means providing a circular chamber for holding a group of rollers in a circle around a pilot plunger, and a single reciprocable pilot plunger comprising a reduced cylindrical part for holding a group of rollers in a circle in the chamber and piloting the same therefrom into the bearing, and an enlarged cylindrical part for holding a retainer ring in concentric relation to the group of rollers and pressing the same onto the end of said bearing so as to retain the rollers therein.

10. The method of making devices of the character described which comprises supporting in a stack a plurality of loose elements sufficient in number at least to substantially fill an annular zone in a hollow body, positioning a pilot centrally with respect to the body in a second concentric annular zone, releasing the loose elements to run by gravity into the second zone so that they assume an arrangement corresponding to their ultimate desired arrangement in the hollow body, pushing the elements while so arranged with a follower ring to the first mentioned zone, and applying said ring to the body to retain said elements therein in the desired arrangement.

11. The method of assembling roller bearings which comprises taking a plurality of bearing rollers in number sufficient to at least form an annular series of such rollers in an annular zone in a hollow bearing body, taking a retainer ring that is adapted to have a press fit on the end of said bearing body and positioning a pilot with the ring thereon in a second annular zone substantially concentric with the first zone, arranging the rollers in an annular series in the second zone approximately in their final desired arrangement, moving the pilot so as to push the rollers while so arranged by means of the retainer ring to the first zone, and in the same movement applying the retainer ring to the hollow body to retain the rollers in said arrangement.

12. The method of making roller bearings of a type consisting of a hollow cup-shaped body having an annular wall with an annular retainer pressed into the open end thereof to retain a plurality of loose rollers annularly arranged therein, the method consisting in supporting in a stack a plurality of loose rollers sufficient in number at least to form a substantially full annular series inside the hollow body, positioning a pilot with an annular retainer thereon in an annular zone of substantially the same diameter as the inside diameter of said body and substantially concentric therewith, releasing the rollers to move by gravity into said zone and assume an arrangement around the pilot and in front of the retainer substantially as ultimately desired in the hollow body, then transferring said rollers while so arranged into the hollow body by endwise movement thereof with the retainer, and applying the retainer to the body to retain the rollers therein in the desired arrangement.

13. The method of making roller bearings of a type consisting of a hollow cup-shaped body having an annular wall with an annular retainer pressed into the open end thereof to retain a plurality of loose rollers annularly arranged therein, the method consisting in taking a plurality of loose rollers sufficient in number at least to form a substantially full annular series inside the hollow body, positioning a pilot with an annular retainer thereon in an annular zone of substantially the same diameter as the inside diameter of said body and substantially concentric therewith, positioning the rollers in said zone around the pilot and arranged in a circle in front of the retainer substantially as ultimately desired in the hollow body, then transferring said rollers while so arranged into the hollow body by endwise movement thereof with the retainer, and applying the retainer to the body to retain the rollers therein in the desired arrangement.

14. The method of making roller bearings of a type consisting of a hollow cylindrical body having a roller retaining ring applied to the open end thereof to retain a plurality of loose rollers annularly arranged therein, the method consisting in taking a plurality of loose rollers sufficient in number to form a substantially complete annular series inside said body, positioning a pilot with a retainer ring in an annular zone of substantially the same diameter as the inside diameter of said body and substantially concentric therewith, arranging the rollers in said zone around the pilot in a circle in front of the retainer ring substantially as ultimately desired in the body, then entering the rollers while so arranged into the body by relative endwise movement therebetween, and applying the retainer ring to the open end of said body while the rollers are still so arranged in the body to retain the rollers therein in such arrangement.

15. The method of making roller bearings of a type consisting of a hollow cylindrical body having a retainer ring applied to the open end thereof to retain a plurality of loose rollers annularly arranged therein, the method consisting in taking a plurality of loose rollers sufficient in number to form a substantially complete annular series inside said body, positioning a pilot and annular external supporting means so as to provide an annular zone of substantially the same diameter as the inside diameter of said body and substantially concentric therewith, positioning a retainer ring also concentric therewith, positioning the rollers in said zone around the pilot and within the external supporting means in a circle in front of the retainer ring substantially as ultimately desired in the hollow body, then advancing the rollers into the body by relative movement of the pilot and body toward each other and withdrawing the external supporting means from the rollers progressively from one end as the body overlaps the rollers more and more in the entry thereof into the body, and finally applying the retainer ring to the body while the rollers are still supported internally by the pilot so as to retain the rollers in the body in the desired arrangement.

16. In a machine for assembling roller bearings, means for holding rollers in a circular chamber, means for locating a bearing member concentric with the set of rollers, means for also locating concentric therewith a retainer ring member adapted to fit on said bearing member, and means for moving one of the latter two members toward the other to push the rollers into the bearing member and press the retaining ring into the bearing member.

17. A roller bearing assembling machine, adapted for assembling rollers and a retaining ring therefor in a cup-shaped bearing, comprising a pilot disposed in concentric relation to the open end of a bearing, members movable transversely relative to the pilot into positions spaced from and around the latter so as to form a circular chamber to receive a group of rollers around the pilot and retain the same in such position, a holder for a retaining ring concentric with the pilot adapted to hold a ring adjacent the ends of the rollers in the chamber, and means for causing relative endwise movement between the bearing and the pilot whereby to enter the rollers into the open end of the bearing and frictionally engage the ring on the bearing so as to leave the rollers retained in a circle around the inside of the bearing.

18. A roller bearing assembling machine adapted for assembling rollers in a hollow cylindrical bearing, comprising a pilot mounted in coaxial relation to the open end of a bearing, sectional jaws movable transversely relative to the pilot into positions spaced from and around the latter so as to form a circular chamber to receive a group of rollers around the pilot and retain the same in such position, means for causing relative movement between the pilot and bearing so as to enter the rollers into the open end of the bearing, means for advancing and retracting the jaw sections in timed relation to one another while still retaining the rollers in position around the pilot until the rollers are nearly completely entered in the bearing, and means for causing the retention of the rollers in the bearing prior to removal of the bearing from the pilot.

19. A roller bearing assembling machine adapted for assembling rollers and a retainer ring therefor in a cup-shaped bearing, comprising a pilot member mounted in coaxial relation to the open end of a bearing, a jaw member movable transversely relative to the pilot member to form part of a circular chamber around the pilot member to receive a group of rollers and retain the same in such position, and a third member concentric with the pilot member serving to hold a retaining ring adjacent the end of the rollers in said chamber, one of the aforesaid members being held in normal position by spring pressure and adapted to yield to permit relative endwise movement between a cup-shaped bearing and the pilot member, whereby to enter the rollers into the bearing, and means for communicating such movement, arranged to frictionally apply the retaining ring to the bearing at the end of the movement so as to retain the rollers therein.

20. In a roller bearing assembling machine comprising a roller feed and a retainer ring feed, means for grouping rollers received from the first feed in a circle in front of a retainer received from the second feed, and means for moving the grouped rollers into a bearing and in the same operation pressing the retainer ring onto the bearing.

21. In a roller bearing assembling machine, means for feeding rollers, means for grouping rollers received from said feed in a circle adjacent a bearing wherein the rollers are to be assembled, means for causing relative endwise movement between the grouped rollers and the bearing whereby to insert the rollers within the bearing in substantially their final assembled position, means for feeding retainers for said rollers, and means whereby a retainer is arranged to be entered in the bearing after the rollers, to hold the rollers in place therein.

22. In a roller bearing assembling machine, the combination of a roller feed, a pilot, means for grouping rollers received from the feed in a circle around the pilot and adjacent a bearing wherein the rollers are to be assembled, means for causing relative movement between the bearing and pilot whereby to enter the grouped rollers into the bearing while still supported internally by the pilot, a retainer feed, and means for inserting a retainer into the bearing for internal support of the grouped rollers independently of the pilot, whereby to permit removal of the pilot.

23. The method of making roller bearings which consists in taking a plurality of loose rollers sufficient in number to form a substantially complete annular series inside a bearing body, positioning a pilot and annular external supporting means so as to provide an annular zone of substantially the same diameter as the inside diameter of said body and substantially concentric therewith, positioning the rollers in said zone around the pilot and within the external supporting means in a circle adjacent the hollow body, then transferring the rollers while so arranged and supported into the hollow body, and inserting a retainer in the body to support the rollers against displacement in the subsequent removal of the pilot.

24. In a roller bearing assembling machine, the combination of an assembling chamber and a substantially horizontal pilot therein around which rollers are arranged to be assembled in a circle, and means for feeding rollers into the top of said chamber on opposite sides of the center of said pilot.

25. In a roller bearing assembling machine, the combination of an assembling chamber having a substantially horizontal pilot therein around which rollers are arranged to be assembled in a circle, the chamber being open above the pilot for the delivery of rollers thereto, and a reciprocating roller feed member movable back and forth relative to the open top of said chamber and arranged to deliver rollers into the chamber on opposite sides of the center of said pilot, for the purpose described.

26. In a roller bearing assembly machine, the combination of an assembling chamber having a substantially horizontal pilot therein around which rollers are arranged to be assembled in a circle, the chamber being open above the pilot for the delivery of rollers thereto, and an oscillating roller feed chute disposed substantially vertically over the open top of said chamber, said chute having a longitudinal passage provided therein, the lower end of which is arranged to communicate with the top of said chamber alternately on opposite sides of the center of the pilot.

27. In a roller bearing assembling machine, the combination of a roller feed, a substantially cylindrical assembling pilot disposed in coaxial relation to a bearing and arranged to have rollers fed thereto and grouped around the same, whereby said pilot provides internal support for a circle of rollers in the assembling of the rollers in the bearing, and means for applying a retainer ring onto the bearing to retain the circularly grouped rollers therein.

28. In a roller bearing assembling machine, the combination of a roller feed, a substantially cylindrical assembling pilot disposed in coaxial relation to a bearing and arranged to have rollers fed thereto and grouped around the same, whereby said pilot provides internal support for a circle of rollers in the assembling of the rollers in the bearing, said pilot also serving to locate a retainer ring in concentric relation to the bearing, and means for applying the ring onto the bearing to retain the circularly grouped rollers therein.

29. The method of making roller bearings which consists in providing loose rollers suitable to form an annular series inside a bearing body, positioning a substantially cylindrical assembly pilot in coaxial relation to the bearing body, positioning the rollers around the pilot so that the latter provides internal support for the group of rollers until a complete annular series is disposed in the bearing body, and then applying a retainer ring on the body to prevent displacement of the rollers therefrom.

AXEL F. REHNBERG.